Patented Feb. 23, 1937

2,072,003

UNITED STATES PATENT OFFICE 2,072,003

CONDENSATION PRODUCT OF CINCHONA BARK ALKALOID

George Lutz, Rocky River, Ohio, assignor, by mesne assignments, to E. I. du Pont de Nemours & Company, Wilmington, Del., a corporation of Delaware No Drawing. Application December 23, 1933, Serial No. 703,843

18 Claims. (Cl. 148—8)

This invention relates to processes of cleaning and pickling metals by the action of acids thereon, and is particularly directed to the use in cleaning and pickling baths of certain new organic substances which I have found to have the property of inhibiting the action of acids upon the metal itself, without in any substantial manner hindering the action of the acids on the oxide, rust, scale, or other undesirable incrustations which are to be removed.

My new organic substances are reaction products of cinchona bark alkaloids, or derivatives thereof, with aldehydes and ketones. Aldehydes and ketones are chemically characterized by containing the carbonyl group

in which R is an organic radical and R' is hydrogen in the case of an aldehyde, and R' is an organic radical in the case of a ketone. I do not know the exact chemical composition of these reaction products, but from the nature of the reacting compounds a condensation reaction would be naturally expected. For the purposes of this application, I shall designate my compounds as condensation products of cinchona bark alkaloids, or derivatives thereof, with aldehydes and ketones.

Among the cinchona bark alkaloids I may mention as suitable, quinine, quinidine, cinchonine and quinoidine.

For purposes of illustration, I shall outline a process of making my preferred product.

Five parts by weight of quinoidine were mixed with two parts by weight of benzaldehyde and the mixture heated in a reflux condenser for about two hours. The product thus obtained is a soft solid, sparingly soluble in water. It is more readily soluble in hot, dilute acids than is quinoidine, and also differs from quinoidine in color and in having a higher softening temperature. My condensation product of quinoidine and benzaldehyde is a more efficient inhibitor than is quinoidine.

I prefer to use my inhibitor in the form of the soft solid above obtained, but I may dry the product to form a dry brown, powder. On drying, the product lost about forty per cent of its weight. This loss of weight would seem to indicate a loss of all the benzaldehyde and a breaking down of my compound to quinoidine, but the dry product obtained is entirely different from quinoidine in its physical and chemical properties. The dry product has a lower efficiency as an inhibitor than has the soft solid, undried product.

I may vary the amount of benzaldehyde from that shown in my specific example. I have obtained satisfactory products with from one part benzaldehyde to about five parts benzaldehyde for each five parts of quinoidine. Using five parts benzaldehyde to five of quinoidine, for example, I obtained a liquid product which was not quite as efficient an inhibitor as my preferred product obtained as above. I may use an even larger proportion of benzaldehyde to quinoidine, but the products thus obtained are slightly lower in efficiency as inhibitors.

While I have specifically mentioned benzaldehyde I do not intend to be limited thereto. I may use any aldehyde or ketone. In the following tables a few typical aldehydes and ketones are listed for purposes of illustration. The efficiencies of the products obtained with various aldehydes and ketones do not vary widely, all being higher than quinoidine. The aldehydes and ketones are listed in the approximate order of the efficiencies of the product:

Table of 2–5 ratio condensation products

| Condensation product of 5 parts quinoidine and 2 parts of— | Physical characteristics of undried product | Physical characteristics of dried product |
|---|---|---|
| Butaldehyde | Thick liquid | Reddish brown powder. |
| Benzaldehyde | Soft solid | Brown powder. |
| Crotonaldehyde | Soft solid | Light brown powder. |
| Furfural | Soft solid | Dark brown powder. |
| Aldol | Fairly hard solid | Light brown powder. |
| Isoamylketone | Thick liquid | Brown powder. |
| Cyclohexanone | Thick liquid | Brown powder. |
| Acetaldehyde | Liquid | Light brown powder. |
| Anisic aldehyde | Soft solid | Brown powder. |
| Methyl cyclohexanone | Liquid | Reddish brown powder. |
| Methyl ethyl ketone | Liquid | Brown powder. |
| Light acetone oil | Thick liquid | Dark brown gum. |
| Acetone | Liquid | Brown powder. |

*Table of 1-1 ratio condensation products*

| Condensation product of 5 parts quinoidine and 5 parts of— | Physical characteristics of undried product | Physical characteristics of dried product |
|---|---|---|
| Aldol | Liquid | Light brown powder. |
| Acetaldehyde | Liquid | Light brown powder. |
| Benzaldehyde | Liquid | Brown powder. |
| Butaldehyde | Liquid | Reddish brown powder. |
| Crotonaldehyde | Liquid | Light brown powder. |
| Furfural | Liquid | Dark brown powder. |
| Methyl cyclohexanone | Liquid | Brown powder. |
| Anisic aldehyde | Liquid | Brown powder. |
| Isoamylketone | Liquid | Brown powder. |
| Acetone | Liquid | Brown powder. |
| Cyclohexanone | Liquid | Brown powder. |
| Light acetone oil | Liquid | Brown powder. |
| Methyl ethyl ketone | Liquid | Brown powder. |

The undried products of the above two tables are more efficient inhibitors than the corresponding dried products, and so I usually prefer to use the undried products. The undried products are all completely soluble in dilute acids, such as 5% sulfuric. It is noted that generally the condensation products with aldehydes are more efficient as inhibitors than the products formed with ketones. The products obtained using a 2–5 ratio of aldehyde or ketone to quinoidine are slightly more efficient than where a ratio of 1–1 was used.

While my illustrative examples, above given, mention only quinoidine, I may use any of the cinchona bark alkaloids or mixtures of them. I may also use derivatives of the cinchona bark alkaloids to produce new condensation products.

Sulfurized quinoidine, for instance, was treated with various aldehydes and ketones according to the procedure outlined in my above specific examples. The below table lists a few typical examples in the approximate order of their efficiencies as inhibitors:

| Condensation product of 5 parts sulfurized quinoidine and 5 parts— | Physical characteristics of undried product | Physical characteristics of dried product |
|---|---|---|
| Benzaldehyde | Thick dark liquid | Brown non-caking powder. |
| Acetone | Dark mobile liquid | Brown non-caking powder. |
| Furfural | Thick dark liquid | Black caking powder. |
| Acetophenone | Thick dark liquid | Brown non-caking powder. |

The undried products listed above disperse readily in hot dilute sulfuric acid, and are very desirable inhibitors.

The high efficiency of my novel products, and their ready solubility in pickling solutions, renders them particularly well suited for use as inhibitors in cleaning and pickling solutions.

Pickling and metal cleaning operations frequently involve the use of a bath of dilute, non-oxidizing acids, such as sulfuric, hydrochloric, acetic, formic, aqueous solutions of acid sulfates, etc., and such baths are used for numerous purposes, of which pickling in steel mills is the most typical representative. The composition, concentration, temperature, and other factors vary with different baths, but the underlying principle comprises, in all cases, the removal of undesirable incrustations by the action of the acid. The base metal so obtained is then, in the absence of an inhibitor, unavoidably subjected to attack by the acid with unnecessary loss of metal, weakening of the article, and unnecessary consumption of acid.

The application of my invention to acid pickling and acid metal cleaning operations does not involve any change in the baths or in the operation thereof, except for the addition of a small amount of the condensation products of my invention. My inhibitors will, to a large extent, prevent attack of acid on the base metal when added in quantities as small as 0.01%. I prefer to use between about 0.02% and 0.1%, but more may be used if desired.

I claim:

1. An inhibitor for use in cleaning and pickling compositions comprising the condensation product of a material from the group consisting of cinchona bark alkaloids and sulfurized cinchona bark alkaloids, with a material from the group consisting of aldehydes and ketones.

2. An inhibitor for use in cleaning and pickling compositions comprising the condensation product of a material from the group consisting of quinoidine and sulfurized quinoidine, with a material from the group consisting of aldehydes and ketones.

3. An inhibitor for use in cleaning and pickling compositions comprising the condensation product of quinoidine with a material from the group consisting of aldehydes and ketones.

4. An inhibitor for use in cleaning and pickling compositions comprising the condensation product of sulfurized quinoidine with a material from the group consisting of aldehydes and ketones.

5. An inhibitor for use in cleaning and pickling compositions comprising the condensation product of about five parts quinoidine and about two parts of an aldehyde.

6. A composition of matter comprising the condensation product of a material from the group consisting of cinchona bark alkaloids and sulfurized cinchona bark alkaloids, with a material from the group consisting of aldehydes and ketones.

7. A composition of matter comprising the condensation product of a material from the group consisting of quinoidine and sulfurized quinoidine, with a material from the group consisting of aldehydes and ketones.

8. A composition of matter comprising the condensation product of quinoidine with a material from the group consisting of aldehydes and ketones.

9. A composition of matter comprising the condensation product of sulfurized quinoidine with a material from the group consisting of aldehydes and ketones.

10. A cleaning and pickling bath for metals comprising a dilute, non-oxidizing acid containing a small amount of the condensation product of a material from the group consisting of cinchona bark alkaloids and sulfurized cinchona bark alkaloids with a material from the group consisting of aldehydes and ketones.

11. A cleaning and pickling bath for metals comprising a dilute, non-oxidizing acid containing a small amount of the condensation product of a material from the group consisting of quinoidine and sulfurized quinoidine, with a material from the group consisting of aldehydes and ketones.

12. A cleaning and pickling bath for metals comprising a dilute non-oxydizing acid containing a small amount of the condensation product of quinoidine with a material selected from the group consisting of aldehydes and ketones.

13. In a process of cleaning and pickling metals the step comprising contacting the metal with an acid solution containing the condensation product of a material from the group consisting of cinchona bark alkaloids and sulfurized cinchona bark alkaloids, with a material from the group consisting of aldehydes and ketones.

14. In a process of cleaning and pickling metals the step comprising contacting the metal with an acid solution containing the condensation product of a material from the group consisting of quinoidine and sulfurized quinoidine, with a material from the group consisting of aldehydes and ketones.

15. In a process of cleaning and pickling metals the step comprising contacting the metal with an acid solution containing the condensation product of quinoidine with a material from the group consisting of aldehydes and ketones.

16. A composition of matter comprising the condensation product of a material from the group consisting of cinchona bark alkaloids and sulfurized cinchona bark alkaloids with benzaldehyde.

17. A composition of matter comprising the condensation product of quinoidine with benzaldehyde.

18. A composition of matter comprising the condensation product of sulfurized quinoidine with benzaldehyde.

GEORGE LUTZ.